Patented Aug. 31, 1954

2,688,014

UNITED STATES PATENT OFFICE 2,688,014

PROCESS FOR THE MANUFACTURE OF EPSILON-THIOCAPROLACTAM

Walter V. Wirth, Woodstown, N. J., assignor to E. I. du Pont de Nemours and Company, Wilmington, Del., a corporation of Delaware No Drawing. Application January 23, 1953, Serial No. 333,000

3 Claims. (Cl. 260—239.3)

This invention relates to an improved process for the manufacture of epsilon-thiocaprolactam which compound has been found to be useful as a non-discoloring vulcanization accelerator particularly suitable for addition to polychloroprene latices.

Epsilon-thiocaprolactam is an old compound, but the procedures described for its preparation are not satisfactory for commercial manufacture. These processes are difficult to operate and give poor yields of a product of low purity.

To make epsilon-thiocaprolactam available for commercial use as a non-discoloring accelerator for polychloroprene, it was necessary to devise a method for its manufacture which would be operable on a large scale to give a product of satisfactory purity in good yields.

In the processes of the prior art, an organic solvent was invariably used in the reaction of the epsilon-caprolactam with phosphorus pentasulfide, and in general these processes produce a gummy, practically unstirrable mass which is difficult to work.

It is therefore an object of the present invention to provide a process for the manufacture of epsilon-thiocaprolactam which is simple and economical to operate and which gives the thiocaprolactam of satisfactory purity for commercial use and in good yields.

I have found that where epsilon-caprolactam is heated at from 50° to 60° C. with a limited amount of water, and phosphorus pentasulfide is gradually added while the temperature is raised to maintain a fluid mass, epsilon-thiocaprolactam having a melting point of from 105.8° to 106.8° C. can be recovered in yields of approximately 90% of theory. To effect the isolation of the epsilon-thiocaprolactam the reaction mass is drowned in hot water, cooled to below the crystallizing point of the molten product, and salted to effect complete precipitation. It is then filtered or otherwise separated from the acid solution, washed and dried.

The amount of water employed should be such as to effect a complete solution of the epsilon-caprolactam and maintain a readily stirrable fluid reaction mass at the temperatures employed. From 10 to 16 parts of water per 100 parts of the caprolactam (that is, from 0.6 to 1 mol of water per mol of epsilon-caprolactam) have been found to operate satisfactorily. The process is preferably carried out with from 11 to 11.5 parts of water per 100 parts of epsilon-caprolactam, that is, with from 0.69 to 0.72 mol of water per mol of epsilon-caprolactam.

The reaction of the epsilon-caprolactam and the phosphorus pentasulfide takes place at relatively low temperatures, but since the epsilon-thiocaprolactam tends to crystallize out at the lower temperatures as the reaction proceeds, the temperature is gradually raised to keep it slightly above the crystallizing point of the mass. The temperature is preferably kept as low as possible to produce a light colored thiocaprolactam. In general satisfactory results are obtained where the epsilon-caprolactam and water are heated to not over 60° C. at the start of the addition of the phosphorus pentasulfide and then the temperature is allowed to rise as far as necessary to maintain a fluid mass. The reaction is preferably finished at from 105° to 125° C. It is desirable to maintain the temperature above 100° C. as the last of the phosphorus pentasulfide is added, to prevent crystallization of the epsilon-thiocaprolactam.

It has been observed that approximately 0.5 mol of hydrogen sulfide is evolved for each mol of water present in the reaction. It is therefore necessary to use somewhat higher amounts of phosphorus pentasulfide as the amount of water used in the reaction is increased, since for each mol of water there is a certain amount of phosphorus pentasulfide that is rendered inactive insofar as the formation of the epsilon-thiocaprolactam is concerned. While larger amounts of water than those specified above may be used, it will be apparent that the use of an excess amount of water merely adds to the cost of the reaction because of the additional phosphorus pentasulfide that must be employed. The yields are not materially affected by the use of larger amounts of water and excesses of phosphorus pentasulfide.

From 0.3 to 0.35 mol of $P_2S_5$ should be used per mol of epsilon-caprolactam where the amount of water used is kept within the limits specified.

The epsilon-thiocaprolactam is preferably isolated by drowning the reaction mass in water. The water may be added directly to the reaction mass, although it has been found that this lowers the yield by a few per cent. The drowning is preferably carried out in hot water, that is, at around 80° C., and maintaining that temperature or temperatures even up to 90° C. to assure complete melting of all of the epsilon-thiocaprolactam. The mass is then allowed to cool while under agitation and the epsilon-thiocaprolactam crystallizes out in high yield and purity. After filtering, the product is washed and dried, and a somewhat higher yield can be obtained if the wash water is salted out to minimize the amount of epsilon-thiocaprolactam that would otherwise be lost in the washing operation. Alternatively, the wash water from one batch may be used for the drowning operation of a subsequent batch. It has been found that this procedure does not in any way affect the purity of the final product and permits a maximum yield to be obtained.

This process eliminates the use of an organic solvent such as specified in the prior art processes, and gives a product of higher purity and in materially increased yields.

The following examples are given to illustrate the invention. The parts used are by weight.

Example 1

113 parts (1 mol) of epsilon-caprolactam and 12.7 parts (0.707 mol) of water are charged into a reaction vessel fitted with an agitator and thermometer. The mixture is heated with stirring to 60° C. until the lactam and water form a clear solution. 70.8 parts (.318 mol) of phosphorus pentasulfide are added gradually over a 1½ hour period and the temperature is gradually raised during the addition from 60° C. to 100° C. The temperature is then raised to 115° C. and held for from 15 to 20 minutes.

The thick mass, consisting of a thin oil phase and a thick but stirrable viscous thiophosphoric acid phase, is drowned into 565 parts of hot water (about 80° C.). The drowned reaction mass is heated to 90° C. to insure that all of the product is molten and then the mass is cooled, with stirring, to let the product granulate. To recover the epsilon-thiocaprolactam, 229 parts of salt is added as the mixture cools to 25° C., the product is filtered off, washed salt-free with water, and dried over night in a vacuum dryer at from 70° to 75° C. and 5 to 7 in. absolute pressure. The yield of off-white product obtained is 118.0 parts or 91.1% of theory. M. P.=106°–106.6° C. Analysis: Percent S=24.79; percent N=10.70. Theory: Percent S=24.81; percent N=10.84.

Example 2

When 11.3 parts of water (0.628 mol) are added to 113 parts (1 mol) of epsilon-caprolactam and the reaction carried out as described in Example 1 using 63.6 parts of P₂S₅ (0.312 mol), an 89.5% yield of epsilon-thiocaprolactam melting at from 106° to 106.6° C. is obtained.

Example 3

When 18 parts of water (1.0 mol) are added to 113 parts (1 mol) of epsilon-caprolactam and the reaction carried out as described in Example 1 using 75.5 parts (.341 mol) of P₂S₅, a yield of 90.97% of product melting at from 105.8° to 106.8° C. is obtained.

I claim:

1. A process for preparing epsilon-thiocaprolactam from epsilon-caprolactam which comprises heating 1 mol of epsilon-caprolactam with from 0.6 to 1.0 mol of water at from 50° to 60° C. to effect complete solution and adding from 0.3 to 0.35 mol of phosphorus pentasulfide while maintaining the temperature sufficiently high to prevent crystallization of the epsilon-thiocaprolactam at the temperatures employed.

2. A process for preparing epsilon-thiocaprolactam from epsilon-caprolactam which comprises heating 1 mol of epsilon-caprolactam with from 0.6 to 1.0 mol of water at from 50° to 60° C. to effect complete solution, adding from 0.3 to 0.35 mol of phosphorus pentasulfide while maintaining the temperature sufficiently high to prevent crystallization of the epsilon-thiocaprolactam at the temperatures employed, drowning the reaction mass in water at temperatures of from 80° to 100° C., cooling to effect precipitation, and separating the epsilon-thiocaprolactam from the acid solution.

3. A process for preparing epsilon-thiocaprolactam from epsilon-caprolactam which comprises heating 1 mol of epsilon-caprolactam with from 0.69 to 0.72 mol of water at from 50° to 60° C. to effect complete solution, and gradually adding from 0.3 to 0.35 mol of phosphorus pentasulfide while allowing the temperature to increase to 105° C. as the reaction proceeds to prevent crystallization of the epsilon-thiocaprolactam as it is formed, and isolating the epsilon-thiocaprolactam from the resulting solution.

References Cited in the file of this patent

UNITED STATES PATENTS

| Number | Name | Date |
|---|---|---|
| 2,201,200 | Pinkney | May 21, 1940 |
| 2,539,325 | Prochazka | Jan. 23, 1951 |

FOREIGN PATENTS

| Number | Country | Date |
|---|---|---|
| 246,180 | Switzerland | Sept. 1, 1947 |
| 611,248 | Germany | Mar. 25, 1935 |

OTHER REFERENCES

Tafel et al., Ber. Deut. Chem., vol. 38, p. 1592 (1905).

Tafel et al., Ber. Deut. Chem., vol. 40, p. 2844 (1907).

Kostir et al., Chem. Abstracts, vol. 45, col. 5105 (1951).